US012646793B2

(12) United States Patent
Lim

(10) Patent No.: US 12,646,793 B2
(45) Date of Patent: Jun. 2, 2026

(54) PRESSURE ACTIVATION APPARATUS WITH DEGASSING UNIT

(71) Applicant: APRO CO., LTD, Gunpo-si (KR)

(72) Inventor: Jong Hyun Lim, Gunpo-si (KR)

(73) Assignee: APRO CO., LTD, Gunpo-si (KR)

( * ) Notice: Subject to any disclaimer, the term of this patent is extended or adjusted under 35 U.S.C. 154(b) by 565 days.

(21) Appl. No.: 18/028,741

(22) PCT Filed: Oct. 29, 2021

(86) PCT No.: PCT/KR2021/015390
§ 371 (c)(1),
(2) Date: Mar. 27, 2023

(87) PCT Pub. No.: WO2022/098002
PCT Pub. Date: May 12, 2022

(65) Prior Publication Data
US 2023/0335855 A1      Oct. 19, 2023

(30) Foreign Application Priority Data

Nov. 3, 2020     (KR) ........................ 10-2020-0145356

(51) Int. Cl.
*H01M 50/342*       (2021.01)
*H01M 50/211*       (2021.01)
(52) U.S. Cl.
CPC ..... *H01M 50/3425* (2021.01); *H01M 50/211* (2021.01)
(58) Field of Classification Search
CPC ........................ H01M 50/3425; H01M 50/211
See application file for complete search history.

(56) References Cited

U.S. PATENT DOCUMENTS

2020/0373631 A1     11/2020  Son et al.

FOREIGN PATENT DOCUMENTS

| CA | 1105556 | A | * | 7/2018 | |
|---|---|---|---|---|---|
| JP | 2015088324 | A | * | 5/2015 | |
| KR | 10-2017-0095013 | A | | 8/2017 | |
| KR | 20170095013 | A | * | 8/2017 | .............. H01M 2/12 |
| KR | 10-2019-0074591 | A | | 6/2019 | |
| KR | 10-2020-0033665 | A | | 3/2020 | |
| KR | 10-2020-0085589 | A | | 7/2020 | |
| KR | 20200085589 | A | * | 7/2020 | ............ H01M 10/44 |

OTHER PUBLICATIONS

CA 1105556 English Translation (Year: 1981).*
JP 2015088324 English Translation (Year: 2015).*
KR 20170095013 English Translation (Year: 2017).*
KR 20200085589 English Translation (Year: 2020).*
International Search Report for PCT/KR2021/015390 mailed Feb. 7, 2022 from Korean Intellectual Property Office.

* cited by examiner

*Primary Examiner* — Jimmy Vo
(74) *Attorney, Agent, or Firm* — Revolution IP, PLLC

(57)              ABSTRACT
Disclosed is a pressure activation apparatus with a degassing unit, in particular, a pressure activation apparatus with a degassing unit, in which gas generated in a pressure activation process for a plurality of pouch-type battery cells respectively mounted to a plurality of pressure units is removed through one movably provided degassing unit, thereby improving a process efficiency in manufacturing the pouch-type battery cell, and reducing time, efforts and costs for the degassing.

7 Claims, 7 Drawing Sheets

【FIG.1】
1
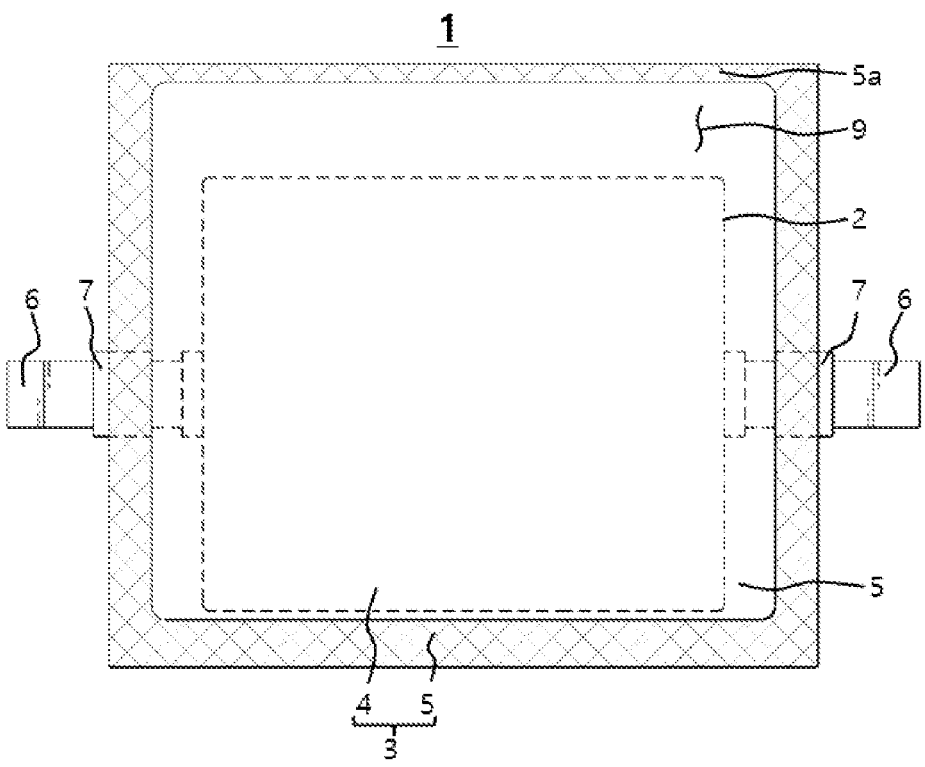
【FIG.2】
100
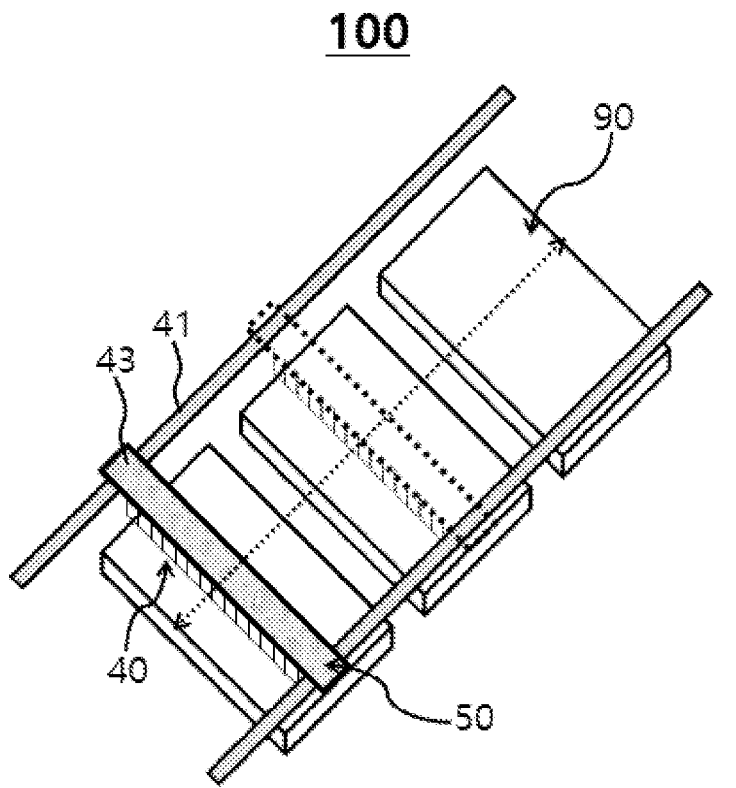

【FIG.3】
90
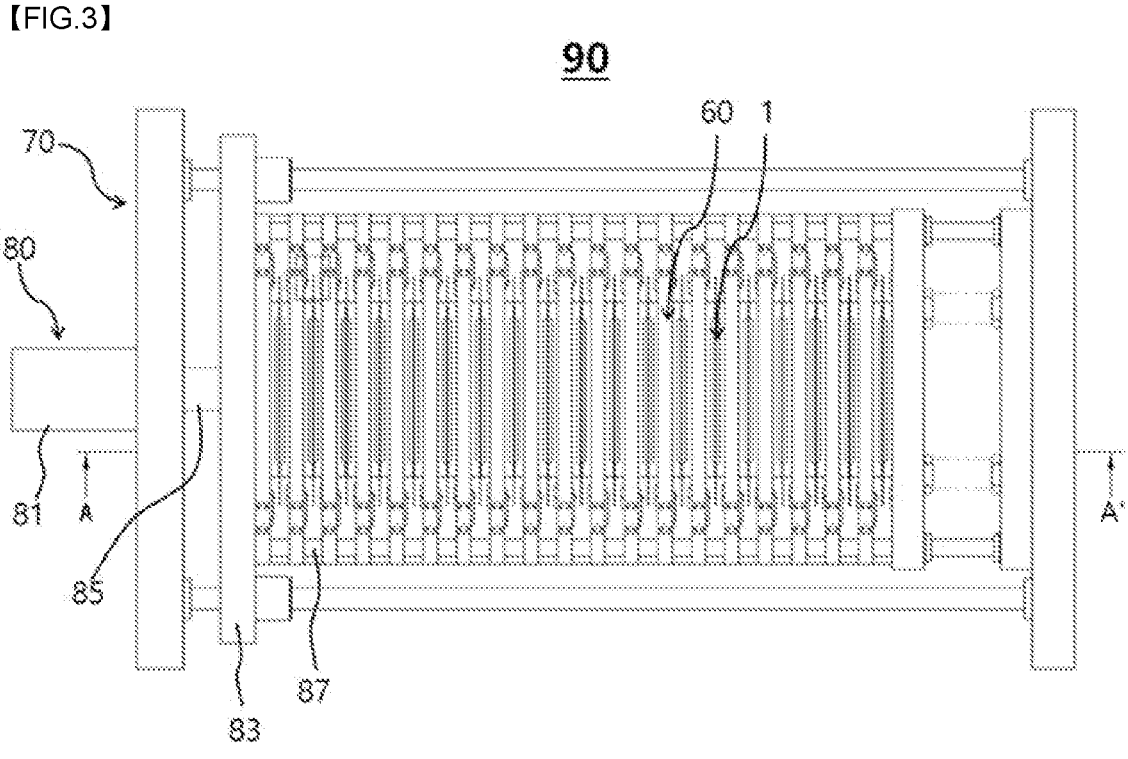
【FIG.4】
90
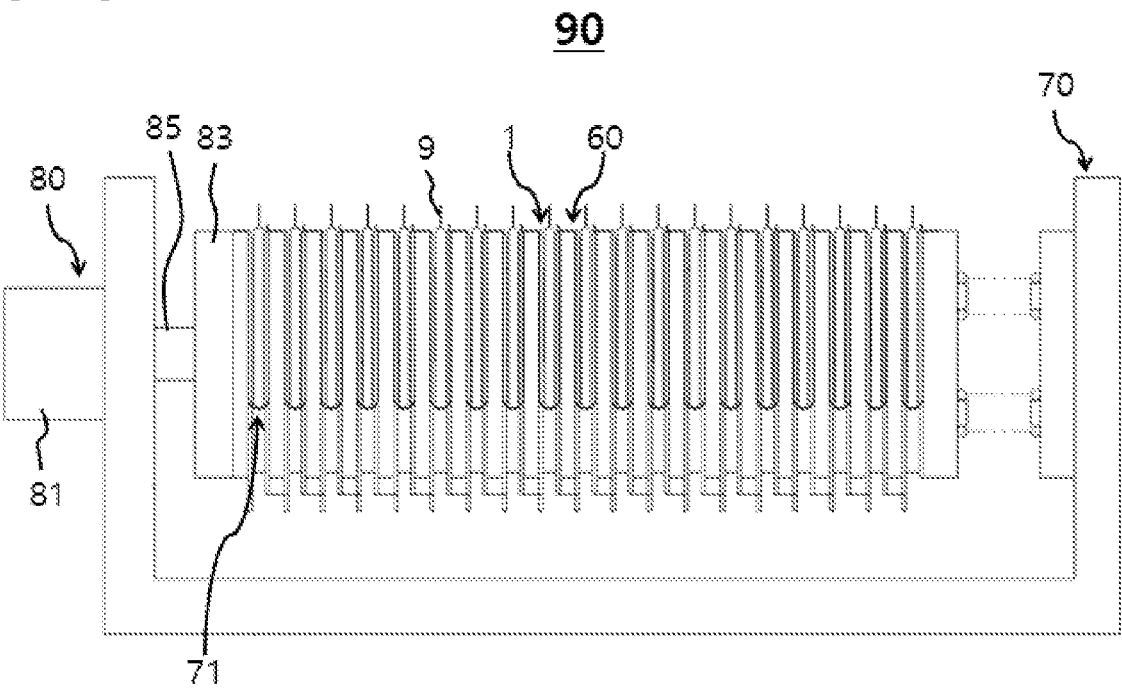

【FIG.5】
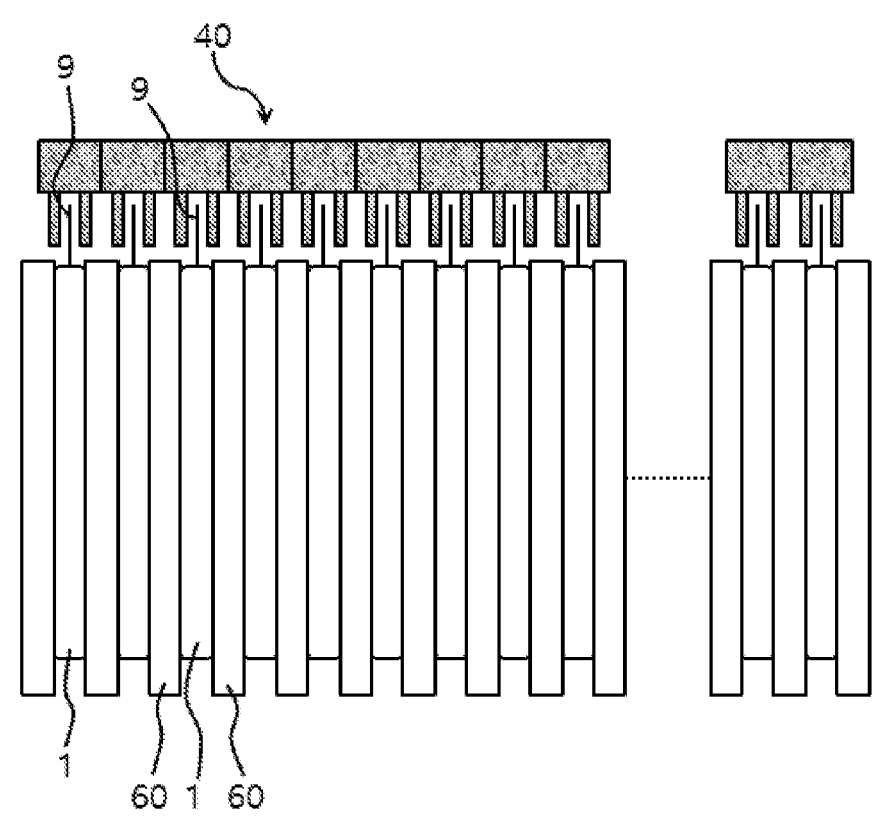
【FIG.6】
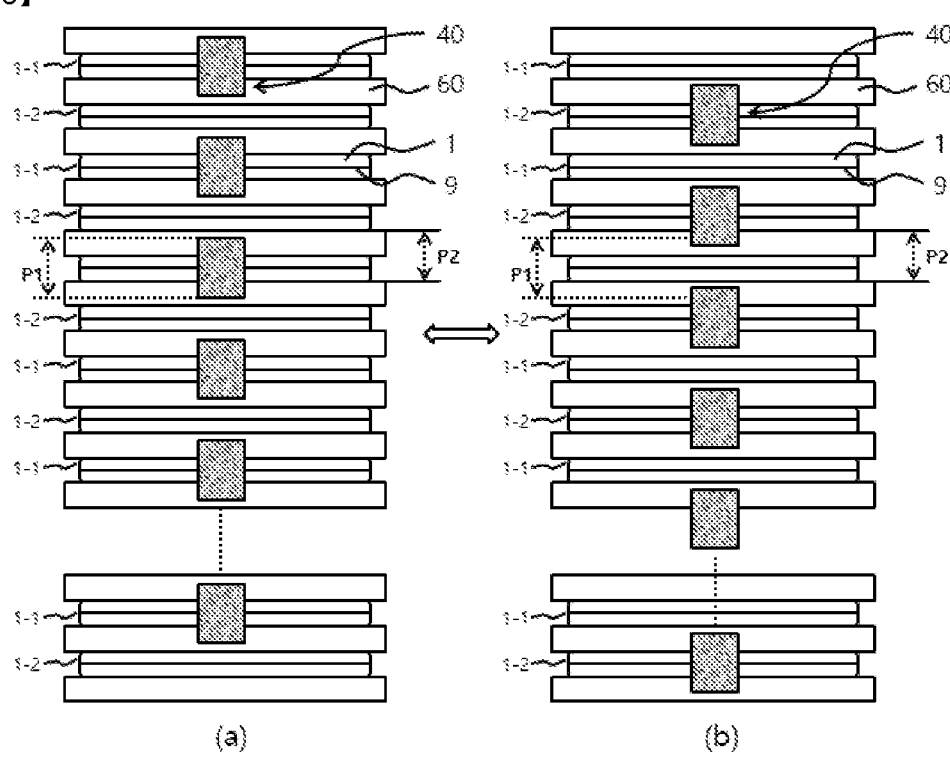
(a)                    (b)

【FIG.7】
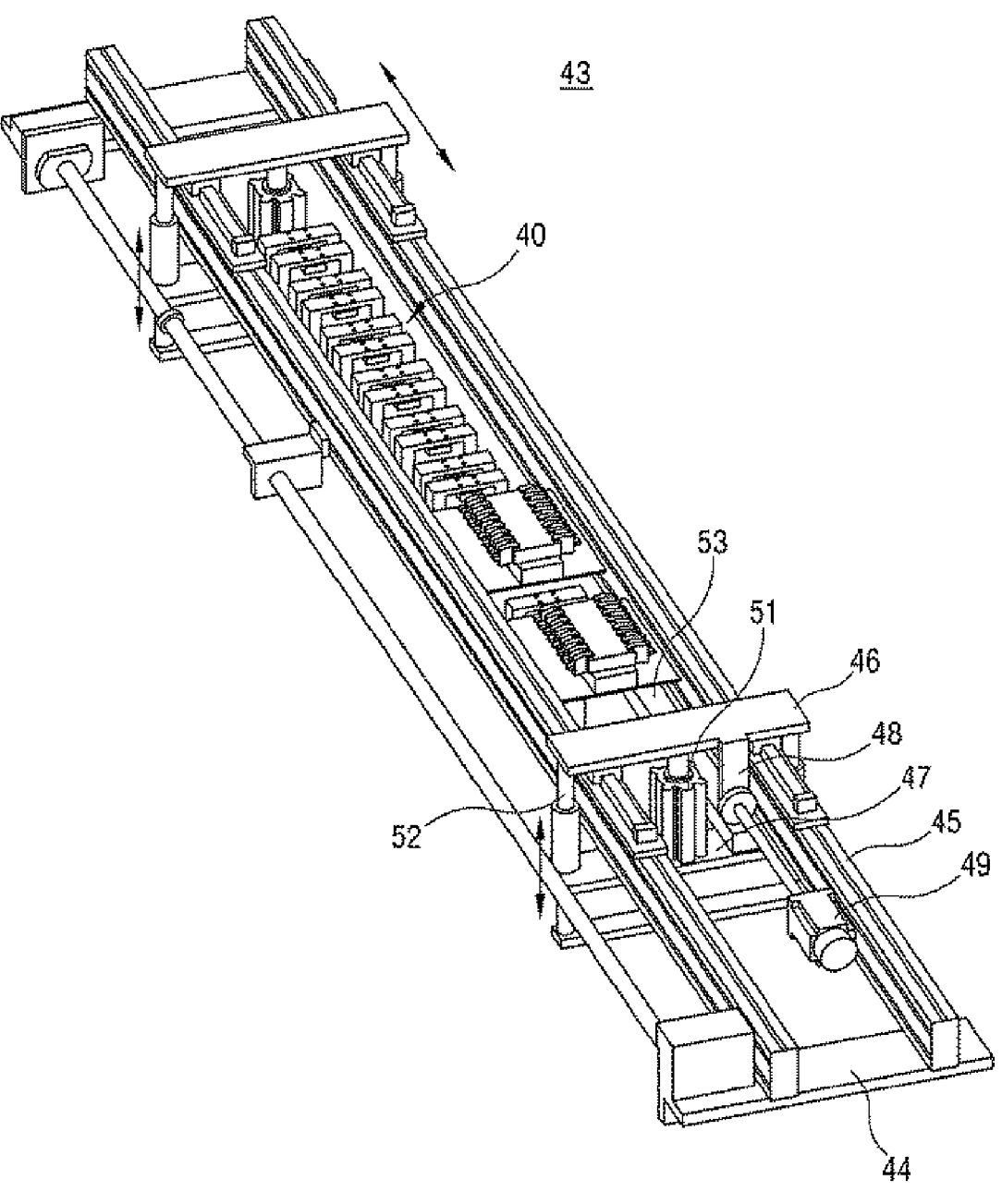

【FIG.8】
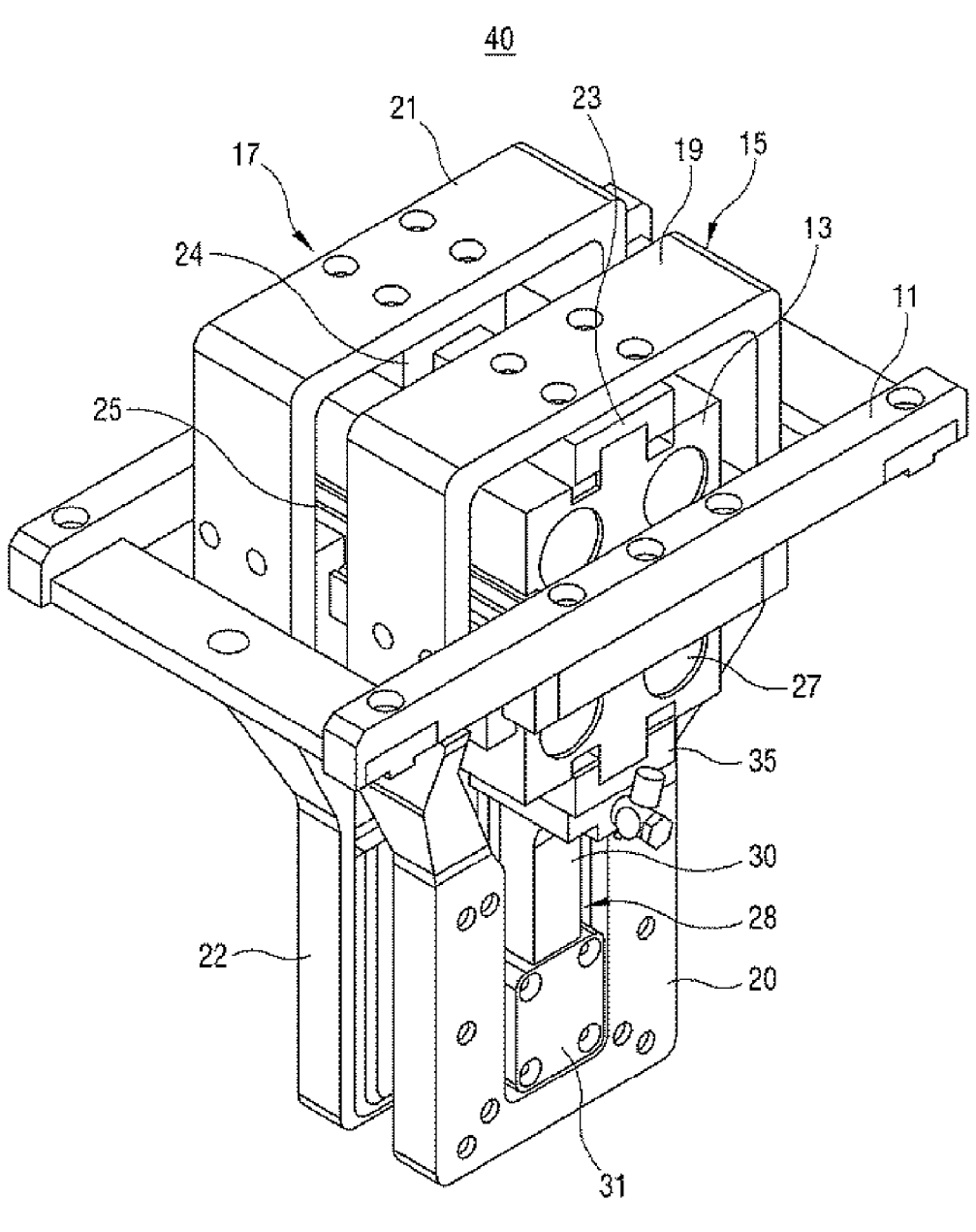

【FIG.9】
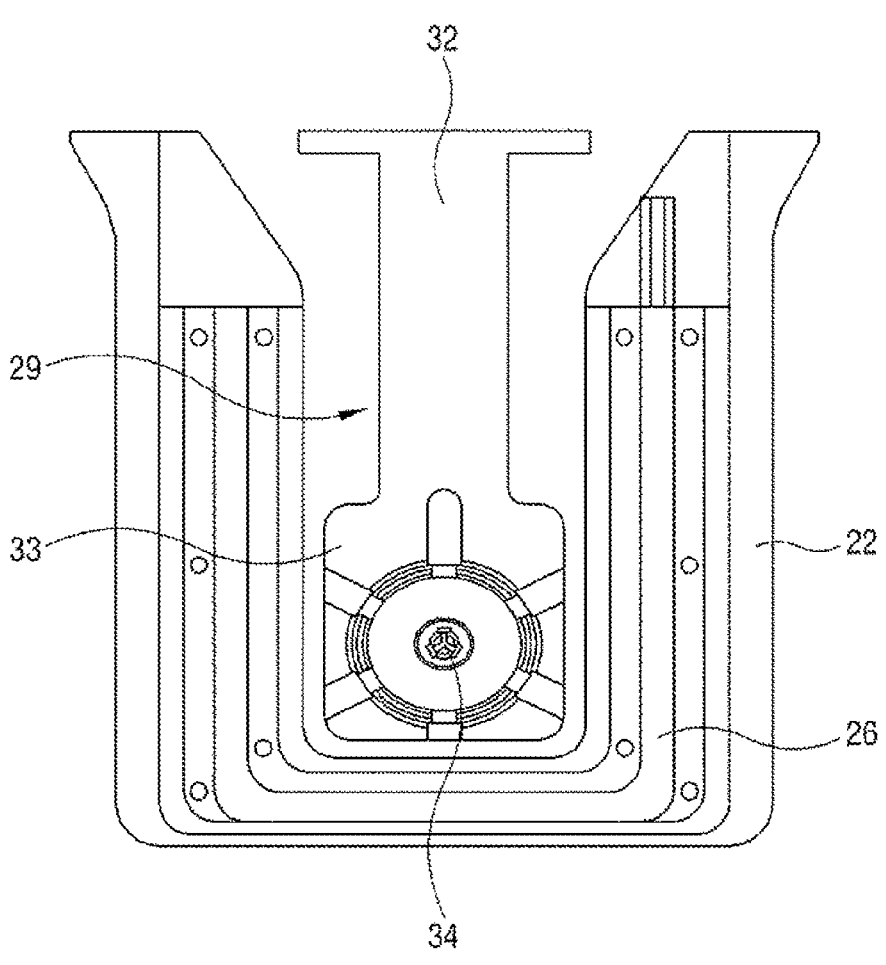

【FIG.10】
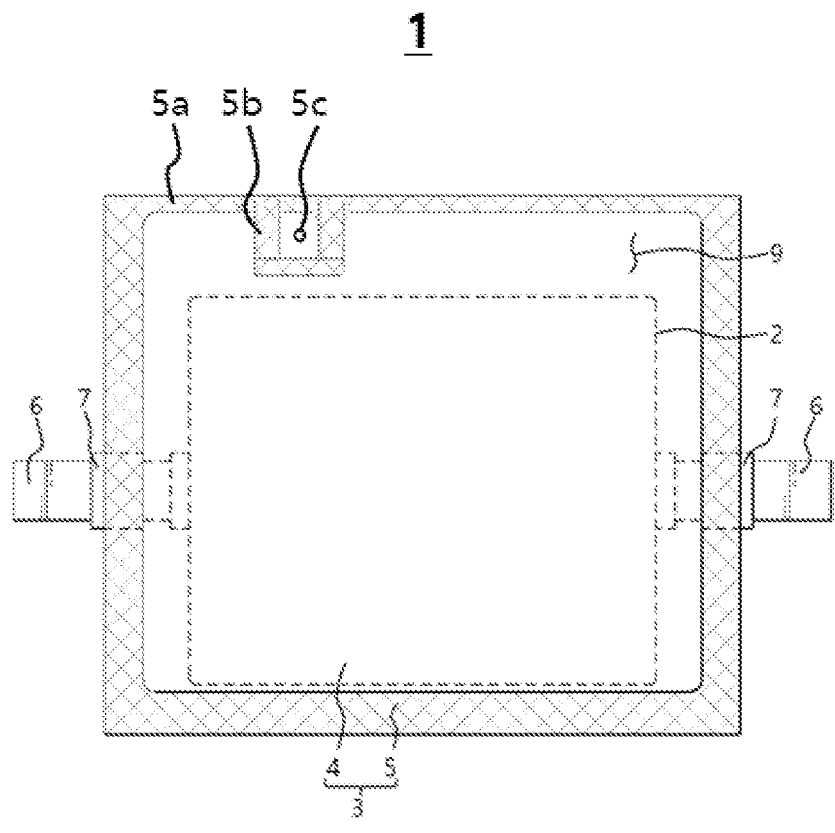

PRESSURE ACTIVATION APPARATUS WITH DEGASSING UNIT

CROSS REFERENCE TO PRIOR APPLICATIONS

This application is the 35 U.S.C. 371 national stage of international application PCT/KR2021/015390 filed on Oct. 29, 2021 which claims priority to Korean Patent Application No. 10-2020-0145356 filed on Nov. 3, 2020. The entire contents of each of the above-identified applications are hereby incorporated by reference.

TECHNICAL FIELD

The disclosure relates to a pressure activation apparatus with a degassing unit, and more particularly to a pressure activation apparatus with a degassing unit, in which gas generated in a pressure activation process for a plurality of pouch-type battery cells respectively mounted to a plurality of pressure units is removed through one movably provided degassing unit, thereby improving a process efficiency in manufacturing the pouch-type battery cell, and reducing time, efforts and costs for the degassing.

BACKGROUND ART

A secondary battery refers to a battery that is repeatedly reusable through charging and discharging. Recently, the secondary battery has been widely used in smartphones, laptop computers, electric vehicles, and the like state-of-the-art electronic devices. In particular, a lithium secondary battery has recently been actively used in various fields because its energy density per unit weight is high and quick charging is possible as compared with other conventional secondary batteries such as a lead-acid battery, a nickel-cadmium battery, a nickel-hydrogen battery, and a nickel-zinc battery.

Among such secondary batteries, a pouch-type battery cell generally includes an electrode assembly which includes a cathode, an anode, and a separator; a pouch casing; and electrode leads. The electrode assembly is accommodated in the pouch casing, and the electrode leads are connected to the electrode assembly and protrude out of the pouch casing.

Meanwhile, when the pouch-type battery cell is manufactured, the pouch casing accommodating the electrode assembly of the completed battery cell is filled with an electrolyte. The completed battery cell undergoes charging and discharging processes after the pouch casing is sealed up. During the charging and discharging processes, gas is generated inside the battery cell. Due to the generated gas, the internal pressure of the battery cell may increase. Further, the increased internal pressure causes the pouch casing to swell up. As a result, a gap may be formed between the electrode plates, and the bonding strength between an active material and a current collector may be weakened.

Accordingly, a pressure activation process for pressurizing the pouch-type battery cell is performed during or after the charging and discharging processes of the pouch-type battery cell. By the pressure activation process, gas is collected in one place inside the pouch-type battery cell. Further, the electrolyte filled in the pouch-type battery cell is evenly distributed.

After the pressure activation process of the pouch-type battery cell, a degassing process is performed to remove the collected gas from the inside of the pouch-type battery cell. In general, the pressure activation process for pressurizing the pouch-type battery cell and the degassing process for removing the generated gas are performed in separate apparatuses. However, high-pressure gas is released out of the pouch-type battery cell as the gas is removed in a short time during the process of removing the gas (i.e., the degassing process) performed in the separate apparatus, and the electrolyte may leak out together in this process, thereby causing a problem.

Further, if the gas generated in the pressure activation process is not immediately removed, i.e., if the degassing process is performed in the separate apparatus, gas between the electrode plates is not completely removed but left, i.e., remains, thereby causing a problem of deteriorating the performance of the pouch-type battery cell. Although it is necessary to perform the degassing process during the pressure activation process in order to solve this problem, the conventional pressure activation process has not been generally performed together with the degassing process.

To solve such a problem, Korean Patent Publication No. 10-2017-0095013 (hereinafter referred to as the "related art document") has disclosed an apparatus and method for manufacturing a secondary battery, in which a process for pressurizing a battery cell and a process for removing gas are performed together, thereby shortening a processing time and improving the efficiency of a battery manufacturing process.

However, the related art document has proposed a configuration in which gas removing units for removing gas generated inside the battery cell are respectively disposed one-to-one corresponding to a plurality of pressure units, thereby causing problems of complicating the configuration of the apparatus, and increasing time, efforts and costs for configuring the apparatus.

Further, the related art document describes only a conceptual configuration of a gas removing unit, but does not suggest detailed configurations and operations of performing the degassing process for the battery cells respectively mounted to the pressure units.

DISCLOSURE

Technical Problem

The disclosure is conceived to solve the problems of the related art, and an aspect of the disclosure is to provide a pressure activation apparatus with a degassing unit, in which gas generated in a pressure activation process for a plurality of pouch-type battery cells respectively mounted to a plurality of pressure units is removed through one movably provided degassing unit, thereby improving a process efficiency in manufacturing the pouch-type battery cell, and reducing time, efforts and costs for the degassing.

Technical Solution

A pressure activation apparatus with a degassing unit according to the disclosure, proposed to solve the foregoing problems, includes a plurality of pressure units pressurizing opposite sides of a plurality of pouch-type battery cells; and a degassing unit disposed above the plurality of pressure units and removing gas generated inside the plurality of pouch-type battery cells, the degassing unit being movably disposed above the plurality of pressure units and performing a degassing process for the plurality of pouch-type battery cells pressurized in the pressure units, the degassing unit including a transport unit disposed along an arrangement direction of the plurality of pressure units; a transport block mounted to reciprocate along the arrangement direction of the plurality of pressure units by the transport unit; and a plurality of venting modules disposed in a row along the arrangement direction of the plurality of pouch-type battery cells, mounted to and supported by the transport block, and venting gas out of the gas pocket through vacuum suction after forming a piercing hole in the gas pocket of each pouch-type battery cell Here, each of the plurality of the venting modules may seal a periphery of the piercing hole when gas is completely vented out of the gas pocket.

Here, the plurality of venting modules may be disposed corresponding to a group of odd-numbered pouch-type battery cells or a group of even-numbered pouch-type battery cells among the plurality of pouch-type battery cells.

Here, the plurality of venting modules may be driven to sequentially perform the degassing process for one group between the group of odd-numbered pouch-type battery cells and the group of even-numbered pouch-type battery cells, and then perform the degassing process for the other group.

Here, when the plurality of venting modules completes the degassing process for one group between the group of odd-numbered pouch-type battery cells and the group of even-numbered pouch-type battery cells, the transport block may drive the plurality of venting modules to be moved up and horizontally transported to a position corresponding to the other group between the group of odd-numbered pouch-type battery cells and the group of even-numbered pouch-type battery cells, and moved down, and the degassing process for the other group between the group of odd-numbered pouch-type battery cells and the group of even-numbered pouch-type battery cells may be performed.

Further, the venting module may include a first air chuck cylinder generating a driving force for performing a sealing operation to seal the piercing hole formed in the gas pocket against the outside, and a second air chuck cylinder disposed below the first air chuck cylinder and generating a driving force for performing an operation to form the piercing hole in the gas pocket.

Advantageous Effects

A pressure activation apparatus with a degassing unit for the foregoing problems and solutions according to the disclosure has advantages of improving a process efficiency in manufacturing the pouch-type battery cell, and reducing time, efforts and costs for degassing because gas generated in a pressure activation process for a plurality of pouch-type battery cells respectively mounted to a plurality of pressure units is removed through one movably provided degassing unit.

DESCRIPTION OF DRAWINGS

FIG. 1 is a schematic plan view of a pouch-type battery cell that is applied to a pressure activation apparatus with a degassing unit according to an embodiment of the disclosure.

FIG. 2 is a schematic configuration view of a pressure activation apparatus with a degassing unit according to an embodiment of the disclosure.

FIG. 3 is a plan view of a pressure unit in a pressure activation apparatus with a degassing unit according to an embodiment of the disclosure, and FIG. 4 is a cross-sectional view taken along A-A of FIG. 3.

FIGS. 5 and 6 are schematic cross-sectional views for respectively showing a certain arrangement relationship and another arrangement relationship between a venting module and a pouch-type battery cell pressurized between pressure plates in a pressure activation apparatus with a degassing unit according to an embodiment of the disclosure.

FIG. 7 is a perspective view of a transport block to which a venting module in a pressure activation apparatus with a degassing unit according to an embodiment of the disclosure is mounted.

FIGS. 8 and 9 are a perspective view and a partial plan view of a venting module in a pressure activation apparatus with a degassing unit according to an embodiment of the disclosure.

FIG. 10 is a schematic plan view of a pouch-type battery cell that has undergone a degassing process through a pressure activation apparatus with the degassing unit according to an embodiment of the disclosure.

BEST MODE

Below, embodiments of a pressure activation apparatus with a degassing unit for the foregoing problems, solutions and effects according to the disclosure will be described with reference to the accompanying drawings.

FIG. 1 is a schematic plan view of a pouch-type battery cell that is applied to a pressure activation apparatus with a degassing unit according to an embodiment of the disclosure. First, a pouch-type battery cell 1 that undergoes a pressure activation process and further undergoes a degassing process during the pressure activation process will be described with reference to FIG. 1.

The pouch-type battery cell 1 according to the disclosure includes an electrode assembly 2, a pouch casing 3, an electrode lead 6, and an insulating tape 7. The electrode assembly 2 includes a cathode, an anode, and a separator. The electrode assembly 2 may be provided in the form of arranging one or more cathodes and one or more anodes with the separator therebetween. The electrode assembly 2 may be provided in the form of alternately stacking multiple cathodes and multiple anodes. Alternatively, the electrode assembly 2 may be provided in the form of winding one cathode and one anode.

The pouch casing 3 has an inner space. The electrode assembly 2 and an electrolyte are accommodated in the inner space of the pouch casing 3. Various structures and materials may be applied to the pouch casing 3. For example, the pouch casing 3 may be provided as a laminate sheet, and the laminate sheet may include a resin layer and a metal layer.

The pouch casing 3 includes a pouch main body 4, and a pouch edge 5. The pouch main body 4 may accommodate the electrode assembly 2. The pouch main body 4 may be formed to have various structures and shapes. The pouch main body 4 according to the disclosure is illustrated as having a rectangular shape when viewed from above. The pouch edge 5 is provided protruding from the pouch main body 4. The pouch edge 5 may seal up the inside of the pouch main body 4 by sealing an edge thereof. Therefore, the pouch edge 5 is formed with a basic sealing portion 5a along the edge thereof.

The electrode leads 6 are electrically connected the electrode assembly 2. The electrode leads 6 may stick out of the pouch edge 5 of the pouch casing 3. For example, the electrode leads 6 may stick out at opposite sides or one side in a lengthwise direction of the pouch casing 3. The electrode leads 6 may be provided to form a pair. One pair of electrode leads 6 may stick out of one side or opposite sides of the pouch casing 3. One of the pair of electrode leads 6 may be provided as a cathode lead, and the other one may be provided as an anode lead. One pair of electrode leads 6 are electrically connected to a pair of electrode tabs coupled to the electrode assembly 2.

The insulating tape 7 may be attached to the electrode lead 6. The insulating tape 7 may prevent a short circuit between the electrode lead 6 and the pouch casing 3. The insulating tape 7 may improve adhesion between the electrode lead 6 and the pouch casing 3. The number of insulating tapes 7 corresponds to the number of electrode leads 6. The insulating tape 7 may be attached around the electrode lead 6. The insulating tape 7 may be provided as an insulating material.

With this configuration, the pouch-type battery cell 1 according to the disclosure includes a space to collect gas, which is generated during the pressure activation process of the pressure activation apparatus according to the disclosure, to one side. In other words, as shown in FIG. 1, the pouch-type battery cell 1 according to the disclosure includes a gas pocket 9 formed by relatively further extending the pouch edge 5 at one side. Therefore, gas generated during the pressure activation process of the pouch-type battery cell 1 may be move to and collected in the gas pocket 9.

The gas pocket 9 refers to a space formed between the pouch main body 4 and the basic sealing portion 5a for the purpose of collecting the generated gas. The gas pocket 9 may be formed on one of four lateral sides of the pouch-type battery cell 1.

Below, specific configurations and operations of a pressure activation apparatus 100 with a degassing unit according to an embodiment of the disclosure, which can perform the pressure activation process and the degassing process for the foregoing pouch-type battery cell 1, will be described in detail.

FIG. 2 is a schematic configuration view of the pressure activation apparatus 100 with a degassing unit according to an embodiment of the disclosure.

As shown in FIG. 2, the pressure activation apparatus 100 with the degassing unit according to an embodiment of the disclosure further includes a degassing unit 50 in addition to the configuration of the existing pressure activation apparatus. Specifically, the pressure activation apparatus 100 with the degassing unit 50 according to the disclosure includes a plurality of pressure units 90 pressurizing the opposite sides of the plurality of pouch-type battery cells 1, and the degassing unit 50 placed above the plurality of pressure units 90 and removing gas generated inside the plurality of pouch-type battery cells 1.

However, the degassing unit 50 according to the disclosure is not stationarily disposed one-to-one corresponding to each pressure unit like some conventionally applied configurations, but movably disposed above the plurality of pressure units 90 and configured to perform the degassing process for the plurality of pouch-type battery cells 1 respectively pressurized by the pressure units 90.

The pressure unit 90 according to the disclosure may pressurize the opposite sides of the plurality of pouch-type battery cells 1. The pressure unit 90 may pressurize the pouch-type battery cell 1 to evenly distribute the electrolyte impregnated in the pouch-type battery cell 1. The plurality of pressure units 90 may be provided. The plurality of pressure units 90 are adjacent to each other in one direction and arranged in sequence.

The pressure unit 90 of the pressure activation apparatus 100 with the degassing unit according to an embodiment of the disclosure is illustrated in FIGS. 3 and 4.

The pressure unit 90, as shown in FIGS. 3 and 4, includes a main body 70 to which the plurality of pouch-type battery cells 1 is loaded and mounted; pressure plates 60 interposed between the interfaces of the pouch-type battery cells 1 and pressurizing the opposite sides of each pouch-type battery cell 1; an interleaved paper 71 disposed between the pressure plates 60 and supporting the pouch-type battery cell 1; and a driving unit 80 driving the pressure plate 60 to move and pressurize the pouch-type battery cell 1, which are well-known in the art and thus will be described roughly only to the extent necessary for the disclosure without detailed descriptions.

The main body 70 forms the outer appearance of the pressure unit 90, and has a structure for accommodating the plurality of pouch-type battery cells 1. The main body 70 may basically include a lower frame, an upper frame, and a pair of connection frames disposed at opposite sides to form a solid shape by connecting the lower and upper frames.

The plurality of pressure plates 60 may be provided in the main body 70 and disposed between the plurality of pouch-type battery cells 1 to face the front and rear surfaces of the plurality of pouch-type battery cells 1. Here, the gas pockets 9 of the plurality of pouch-type battery cells 1 may be disposed to stick out in an upward direction of the main body 70. In other words, the gas pockets 9 of the plurality of pouch-type battery cells 1 according to the disclosure may be disposed to protrude upwards between the plurality of pressure plates 60. Alternatively, the gas pocket 9 may stick out in a lateral or downward direction according to arrangement and approach directions of a venting module 40 (to be described later) according to the disclosure.

The driving unit 80 may drive the plurality of pressure plates 60 to slide in forward and backward directions (pressurizing direction) of the main body 70 so that the plurality of pressure plates 60 can pressurize the front and rear surfaces of the plurality of pouch-type battery cells 1.

To this end, the driving unit 80 may include a driving source 81, a driving plate 83, a driving shaft 85, and a guide rail 87. The driving plate 83 may be provided in the main body 70 to face the outermost pressure plate 60 disposed at one side among the plurality of pressure plates 60.

The driving shaft 85 is connected to the driving plate 83, and driven by the driving source 81 to make the driving plate 83 slide in the forward and backward directions (pressurizing direction) of the main body 70 so that the plurality of pressure plates 60 can slide in the forward and backward directions (pressurizing direction) of the main body 70.

The guide rail 87 may be fixedly disposed between the pair of connection frames of the main body 70 along the forward and backward directions (pressurizing direction) of the main body 70. The guide rail 87 is connected to the plurality of pressure plates 60 and the driving plate 83, thereby guiding the plurality of pressure plates 60 and the driving plate 83 to slide.

Among the plurality of pressure plates 60, a pair of adjacent pressure plates 60 pressurizes the pouch-type battery cell 1 mounted therebetween, thereby performing the pressure activation process. Meanwhile, the pressure activation apparatus 100 with the degassing unit according the disclosure employs the degassing unit to perform a degassing operation of removing gas, which is generated in the pouch-type battery cell 1, during the pressurizing. To this end, the pouch-type battery cell 1 according to the disclosure is, as shown in FIG. 4, mounted and disposed between the pressure plates 60, with its gas pocket 9 sticking out upwards.

Therefore, the venting module 40 of the degassing unit 50 (to be described later) forms a piercing hole 5*c* (see FIG. 10) in the gas pocket 9 from above the gas pocket 9, sucks and vents gas leaking out by driving an area including the piercing hole 5*c* (i.e., a gas venting area) to be vacuumized, and seals the piercing hole 5*c* or the periphery of a gas leaking area when the gas is completely vented.

With this configuration, the pressure unit 90 schematically operates as follows. The pouch-type battery cell 1 is inserted in between the pressure plates 60 arranged at regular intervals in the main body 70, and the inserted pouch-type battery cell 1 is inserted by the interleaved paper 71 interleaved between the pressure plates 60.

In the state that the pouch-type battery cell 1 is inserted as described above, the driving unit 80 drives the pressure plates 60 to pressurize the pouch-type battery cell 1 and then a heating pad (not shown) provided in the pressure plate 60 operates so that the pressurized pouch-type battery cell 1 can be heated up and subjected to the pressure activation process.

While undergoing the pressure activation process, the pouch-type battery cell 1 may also be subjected to a charging and discharging process or a voltage measuring process, or may be subjected to the degassing operation of removing gas, which is generated in the pouch-type battery cell 1 during the pressure activation process, by the degassing unit 50 according to an embodiment of the disclosure.

The degassing unit 50 according to the disclosure performs the operation of removing gas, which is generated inside the plurality of pouch-type battery cells 1, above the plurality of pressure units 90 as shown in FIG. 2. However, the degassing unit 50 according to the disclosure is configured as not a plurality of degassing units stationarily disposed corresponding to the plurality of pressure units 90 but a single degassing unit capable of performing the degassing process for all the plurality of pouch-type battery cells 1 respectively mounted to the plurality of pressure units 90.

To this end, the degassing unit 50 according to the disclosure is movably disposed above the plurality of pressure units 90, and configured to perform the degassing process for the plurality of pouch-type battery cells 1 respectively pressurized by the pressure units 90.

FIG. 2 illustrates that one degassing unit 50 is configured to perform the degassing process for the plurality of pouch-type battery cells 1 respectively mounted to the pressure units 90 while reciprocating above three pressure units 90. As an alternative example to three pressure units 90 shown in FIG. 2, one degassing unit 50 may be configured to perform the degassing process with respect to four or more pressure units 90.

The degassing unit 50 according to the disclosure needs to reciprocate above the plurality of pressure units 90 as described above. To this end, the degassing unit 50 according to the disclosure includes a transport unit 41 disposed along the arrangement direction of the plurality of pressure units 90; a transport block 43 mounted to reciprocate along the arrangement direction of the plurality of pressure units 90 by the transport unit 41; and a plurality of venting modules 30 disposed in a row along the arrangement direction of the plurality of pouch-type battery cells 1, mounted to and supported by the transport block 43, and venting gas out of the gas pocket 9 through vacuum suction after forming the piercing hole 5*c* in the gas pocket 9 of each pouch-type battery cell 1.

MODE FOR INVENTION

Detailed configurations and operations of the degassing unit 50 are as follows.

The transport unit 41 is configured to make the transport block 43, to which the plurality of venting modules 30 are supported and mounted in a row, reciprocate along the arrangement direction of the plurality of pressure units 90. The transport unit 41 may be variously configured as long as it can make the transport block 43 reciprocate. For example, the transport unit 41 may be provided as a pair of rails or ball screws to transport the transport block 43 while supporting the opposite sides of the transport block 43, which may be driven by a driving motor.

The transport block 43 is mounted to the transport unit 41 so as to reciprocate along the arrangement direction of the plurality of pressure units 90 by the transport unit 41. In addition, the transport block 43 supports the plurality of venting modules 40 mounted thereto in a row along the arrangement direction of the plurality of pouch-type battery cells 1. To perform the degassing process for the pressurized pouch-type battery cell 1, the plurality of venting modules 40 needs to be positioned at a "degassing point" corresponding to each of the plurality of pouch-type battery cells 1 mounted to the corresponding pressure units 90. To this end, a control means (not shown) drives the transport unit 41 to transport the transport block 43 above the corresponding pressure unit 90 so that the plurality of venting modules 40 can be positioned at the degassing point corresponding to each of the plurality of pouch-type battery cells 1 mounted to the pressure unit 90.

Meanwhile, while transporting the transport block 43 to position the plurality of venting modules 40 supported by the transport block 43 to the respective degassing points, there should be no interference with peripheral components or instruments. To this end, in some cases, the transport unit 41 may be configured to move up and down. Specifically, the transport unit 41 may be moved up and down by a lifting cylinder (not shown) disposed thereunder as necessary.

Each of the plurality of venting modules 40 performs the degassing process at the "degassing point." Specifically, each of the plurality of venting modules 40 is mounted to and supported by the transport block 43 and forms the piercing hole 5*c* in the gas pocket 9 of each pouch-type battery cell 1, thereby venting gas out of the gas pocket 9 through vacuum suction. However, the plurality of venting modules 40 are not disposed one-to-one corresponding to all the plurality of pouch-type battery cells 1 mounted to the pressure unit, but disposed in a row corresponding to odd-numbered pouch-type battery cells 1 or even-numbered pouch-type battery cells 1, which will be described later.

Each venting module 40 forms the piercing hole 5*c* in the gas pocket 9 of the corresponding pouch-type battery cell 1, and then performs an operation of venting out gas collected in the gas pocket 9 by vacuum suction. Then, a sealing process for sealing the piercing hole 5*c* may be performed as a separate process. However, according to the disclosure, each venting module 40 also performs the sealing process for the piercing hole 5*c* in succession. In other words, each of the plurality of venting modules 40 according to the disclosure additionally performs the operation of sealing the periphery of the piercing hole 5*c* when the operation of venting gas out of the gas pocket 9 is completed.

FIG. 5 is a schematic cross-sectional view showing that the plurality of venting modules 40 are disposed above the corresponding pouch-type battery cells 1 pressurized by the pressure plates 60. In FIG. 5, each of the plurality of venting modules 40 is positioned at the "degassing point." In other words, each venting module 40 is positioned at a point where the gas pocket 9 of the corresponding pouch-type battery cell 1 is interposed between a first piercing plate 31 (see FIG. 8) and a second piercing plate 33 (see FIG. 9) or between a first sealing plate 20 (see FIG. 8) and a second sealing plate 22 (see FIGS. 8 and 9).

FIG. 5 illustrates that the plurality of venting modules 40 are straightly arranged in a row and disposed above the corresponding pouch-type battery cells 1, respectively. However, when the width of the venting module 40 increases or when the thickness of the pouch-type battery cell 1 decreases, the plurality of venting modules 40 sequentially corresponding to the pouch-type battery cells 1 may not be straightly arranged in a row.

Specifically, as shown in FIG. 6, when the width P1 of venting module 40 is greater than a distance P2 between the pressure plates 60 varied depending on the thickness of the pouch-type battery cell 1, the plurality of venting modules 40 may not be arranged in a row sequentially corresponding to the plurality of pouch-type battery cells 1.

To solve such a problem, the plurality of venting modules 40 may be arranged in a plurality of rows in the transport block 43, and the plurality of venting modules 40 arranged in each row may be disposed to cross the plurality of venting modules 40 arranged in another row. However, the configuration of the plurality of venting modules arranged in a plurality of rows is so complicated that elements for driving these venting modules also becomes complicated, thereby having a problem of making it very difficult to configure the degassing unit, and requiring time, efforts and costs for the configuration more than necessary.

To solve this problem, in the pressure activation apparatus 100 with the degassing unit according to the disclosure, the plurality of venting modules 40 are not arranged one-to-one corresponding to all the plurality of pouch-type battery cells 1, but arranged corresponding to a group of some pouch-type battery cells as shown in FIG. 6. Specifically, the plurality of venting modules 40 according to the disclosure are, as shown in FIG. 6, arranged corresponding to a group 1-1 of odd-numbered pouch-type battery cells or a group 1-2 of even-numbered pouch-type battery cells among the plurality of pouch-type battery cells 1

With this configuration, when the degassing process is carried out by driving the plurality of venting modules 40 according to the disclosure, the degassing process is performed for only a group of some pouch-type battery cells, in other words, the group 1-1 of odd-numbered pouch-type battery cells or the group 1-2 of even-numbered pouch-type battery cells. Therefore, to perform the degassing process for all the plurality of pouch-type battery cells 1 mounted to one pressure unit 90, the plurality of venting modules 40 is required to operate twice for the degassing process.

Specifically, the plurality of venting modules 40 may be driven to sequentially perform the degassing process for any one of the group 1-1 of odd-numbered pouch-type battery cells and the group 1-2 of even-numbered pouch-type battery cells, and then perform the degassing process for the other group.

To perform such operations, the degassing unit 50, specifically, the transport block 43 and the venting module 40 may be variously configured. FIG. 7 shows an exemplary configuration of the transport block 43 according to the disclosure. The transport block 43 supports the plurality of venting modules 40 mounted thereto.

As shown in FIG. 7, the transport block 43 exemplarily applied according to the disclosure includes transport supports 44 and connection supports 45 as basic frames. The transport supports 44 are disposed at opposite sides of the transport block 43 and transported while being supported by the transport unit 41. Further, the connection supports 45 are connected to and disposed being put on the opposite transport supports 44 and form a pair facing each other.

A horizontal transport frame 46 is movably mounted to and supported on the pair of connection supports 45. In other words, the horizontal transport frame 46 is disposed across the pair of connection supports 45, and mounted to the connection supports 45 movably in a horizontal direction with its opposite lower ends put on the guide rail or the like. The horizontal transport frames 46 may be provided as a pair to be respectively disposed on the opposite sides of the connection supports 45 forming a pair.

Below the pair of connection supports 45, a vertical transport frame 47 is disposed. The vertical transport frame 47 may be vertically disposed opposite the horizontal transport frame 46. Therefore, the vertical transport frames 47 also form a pair.

A connection frame 48 is attached and connected to the lower side of the horizontal transport frame 46, and a driving shaft of a horizontal transport actuator 49 is connected to the connection frame 48. The horizontal transport actuator 49 includes a cylinder and the like and drives the horizontal transport frame 46 connected to the connection frame 48 to reciprocate horizontally. When the horizontal transport frame 46 reciprocates horizontally, the plurality of venting modules 40 also reciprocates horizontally. Configurations and operations for the reciprocation are as follows.

A vertical transport actuator 51 is connected to the horizontal transport frame 46, and the vertical transport actuator 51 is mounted to the vertical transport frame 47. As a result, the vertical transport frame 47 may reciprocate vertically based on a vertical driving force of the vertical transport actuator 51. The vertical transport actuator 51 may include a cylinder and the like.

The guide rod 52 is coupled to opposite lower portions of the horizontal transport frame 46 in a vertical direction. The guide rod 52 guides the vertical transport frame 47 to reciprocate vertically. In other words, the guide rods 52 are mounted in the form of passing through the opposite portions of the vertical transport frame 47, respectively.

A mounting frame 53 is coupled as being put on the pair of vertical transport frames 47. In other words, the mounting frame 53 is seated on and coupled to the opposite vertical transport frames 47 as being put on the opposite vertical transport frames 47. The mounting frames 53 form a pair to face each other.

The plurality of venting modules 40 is coupled and mounted to the pair of mounting frames 53. Specifically, a coupling frame 11 of the venting module 40 shown in FIG. 8 is coupled and mounted to the pair of mounting frames 53. As a result, the plurality of venting modules 40 may be mounted to the pair of mounting frames 53 in a row.

With this configuration, when the horizontal transport actuator 49 operates, the horizontal transport frame 46 may reciprocates horizontally and the vertical transport frame 47 connected to the horizontal transport frame 46 via the guide rods 52 may also reciprocate horizontally. The mounting frame 53 connected to the vertical transport frame 47 may also reciprocate horizontally, and as a result the plurality of venting modules 40 mounted to the mounting frame 53 may reciprocate horizontally.

Therefore, when the plurality of venting modules 40 completes the degassing process for the group 1-1 of odd-numbered pouch-type battery cells as shown in (a) of FIG.

6, the horizontal transport frame 46 is driven to transport the plurality of venting modules 40 to a position corresponding to the group 1-2 of even-numbered pouch-type battery cells as shown in (b) of FIG. 6 and then perform the degassing process for the group 1-2 of even-numbered pouch-type battery cells With this configuration, the plurality of venting modules 40 may be disposed corresponding to the group 1-1 of odd-numbered pouch-type battery cells or the group 1-2 of even-numbered pouch-type battery cells among the plurality of pouch-type battery cells, and the plurality of venting modules 40 may be driven to sequentially perform the degassing process for one of the group 1-1 of odd-numbered pouch-type battery cells and the group 1-2 of even-numbered pouch-type battery cells, and then the degassing process for the other group. As a result, all the plurality of pouch-type battery cells mounted to each pressure unit 90 may undergo the degassing process through a stroke transport operation of the plurality of venting modules 40 according to the disclosure.

When the plurality of venting modules 40 completes the degassing process for one group between the group 1-1 of odd-numbered pouch-type battery cells and the group 1-2 of even-numbered pouch-type battery cells, the plurality of venting modules 40 needs to be transported to a position corresponding to the other group. However, at this time, if the plurality of venting modules is horizontally transported directly from one group to another group, there is interference with the pouch-type battery cell 1, specifically, the gas pocket 9. Therefore, the plurality of venting modules 40 needs to be transported horizontally after moving up to a position where there is no interference with the gas pocket 9.

To this end, when the vertical transport actuator 51 operates, the vertical transport frame 47 moves up based on the vertical driving force of the vertical transport actuator 51, and the mounting frame 53 supported by and connected to the vertical transport frame 47 also moves up, thereby finally moving up the plurality of venting modules 40 mounted to the mounting frame 53.

After the plurality of venting modules 40 moves up to avoid the interference with the gas pocket 9 by the foregoing operations, the plurality of venting modules 40 is driven to be horizontally transported. In other words, the plurality of venting modules 40 is transported from the group 1-1 of odd-numbered pouch-type battery cells to a position corresponding to the group 1-2 of even-numbered pouch-type battery cells.

When the plurality of venting modules 40 is transported to the position corresponding to the group 1-2 of even-numbered pouch-type battery cells as described above, the plurality of venting modules 40 needs to move down to a position, in which the degassing process for each gas pocket 9 of the group 1-2 of even-numbered pouch-type battery cells is possible, in order to perform the degassing process for the group 1-2 of even-numbered pouch-type battery cells.

To this end, when the vertical transport actuator 51 is driven to stretch, the vertical transport frame 47 may move down, and thus the mounting frame 53 may also move down, thereby finally moving down the plurality of venting modules 40 mounted to the mounting frame 53. At this position, the degassing process is performed for the group 1-2 of even-numbered pouch-type battery cells.

Next, detailed configurations and operations of each venting module 40 will be described with reference to FIGS. 8 and 9. As described above, each of the plurality of venting modules 40 has a structure for performing a piercing operation, a vacuum suction operation, and a sealing operation for the pouch-type battery cell 1.

As shown in FIG. 8 and FIG. 9, each venting module 40 according to the disclosure includes the coupling frame 11 to be mounted to the mounting frame 53. The venting module 40 includes a first air chuck cylinder 13 and a second air chuck cylinder 27 which are mounted and coupled to the coupling frame 11 directly or indirectly via another medium.

The first air chuck cylinder 13 generates a driving force for performing the sealing operation to seal the piercing hole 5c formed in the gas pocket 9 against the outside, and the second air chuck cylinder 27 generates a driving force for performing the piercing operation to form the piercing hole 5c in the gas pocket 9.

The first air chuck cylinder 13 performs an operation for driving a first sealing block 15 and a second sealing block 17 to come into contact with each other. Specifically, the first sealing block 15 and the second sealing block 17 are disposed to face each other, and driven to come into contact with each other or be spaced apart from each other by the first air chuck cylinder 13.

The first sealing block 15 includes a first moving frame 19 driven to move horizontally by the first air chuck cylinder 13, and a first sealing plate 20 integrally formed in a lower portion of the first moving frame 19 and having a pad contact portion (not shown) formed on an inner surface thereof to be in contact with a sealing pad 26. Correspondingly, the second sealing block 17 includes a second moving frame 21 driven to move horizontally by the first air chuck cylinder 13, and a second sealing plate 22 integrally formed in a lower portion of the second moving frame 21 and having the sealing pad 26 formed on an inner surface thereof.

The first moving frame 19 is driven to move by the first air chuck cylinder 13 through a first moving body 23, and the second moving frame 21 is driven to move by the first air chuck cylinder 13 through a second moving body 24. As a result, the first air chuck cylinder 13 may drive the first sealing plate 20 integrally connected to the first moving frame 19 and the second sealing plate 22 integrally connected to the second moving frame 21 to come into contact with each other and be spaced apart from each other.

For the stable horizontal movement of the first moving frame 19 and the second moving frame 21, a rail or the like moving guide 25 may be provided in the first air chuck cylinder 13 or a connecting medium. Therefore, the first sealing block 15 and the second sealing block 17 may stably move in a horizontal direction.

With this configuration, during the degassing process, the first sealing plate 20 and the second sealing plate 22 may move to come into close contact with each other with the gas pocket 9 of the pouch-type battery cell 1 therebetween, thereby performing the sealing operation for sealing the piercing hole 5c formed in the gas pocket 9 against the outside.

The second air chuck cylinder 27 performs an operation for driving a first piercing/suction block 28 and a second piercing/suction block 29 to move closer or come into contact with each other. Specifically, the first piercing/suction block 28 and the second piercing/suction block 29 are disposed to face each other, and driven to move closer and come into contact with each other or move away and be spaced apart from each other by the second air chuck cylinder 27.

The second air chuck cylinder 27 is disposed below the first air chuck cylinder 13, and the first piercing/suction block 28 and the second piercing/suction block 29 are respectively accommodated inside the first sealing plate 20 and the second sealing plate 22 having a 'U'-shape opened upwards.

The first piercing/suction block 28 includes a first connecting body 30 driven to move horizontally by the second air chuck cylinder 27, and a first piercing plate 31 integrally formed in a lower portion of the first connecting body 30 and formed with an insertion groove (not shown) to accommodate a piercing pin 34 therein. Correspondingly, the second piercing/suction block 29 includes a second connecting body 32 driven to move horizontally by the second air chuck cylinder 27, and a second piercing plate 33 integrally formed in a lower portion of the second connecting body 32 and formed with the piercing pin 34 on an inner side thereof.

The first connecting body 30 and the second connecting body 32 are driven to move by the second air chuck cylinder 27 through a third moving body 35. As a result, the second air chuck cylinder 27 may drive the first piercing plate 31 integrally connected to the first connecting body 30 and the second piercing plate 33 integrally connected to the second connecting body 32 to move closer and come into contact with each other or to move away and be spaced apart from each other.

With this configuration, during the degassing process, the first piercing plate 31 and the second piercing plate 33 may move to come into close contact with each other with the gas pocket 9 of the pouch-type battery cell 1 therebetween, thereby forming the piercing hole 5c in the gas pocket 9 and then performing the vacuum suction operation.

The second piercing plate 33 is formed with the piercing pin 34, and the first piercing plate 31 is formed with the insertion groove (not shown). The insertion groove provides a space to accommodate a tip portion of the piercing pin 34 mounted to and provided in the second piercing plate 33. In other words, the tip portion of the piercing pin 34 mounted to and protruding from the second piercing plate 33 needs to penetrate the gas pocket 9 in order to ensure that the first piercing plate 31 and the second piercing plate 33 are driven to approach each other by the second air chuck cylinder 27 to reliably form the piercing hole 5c in the gas pocket 9. In this case, the insertion groove is formed at a center portion of the first piercing plate 31 in order to reliably and efficiently form the piercing hole 5c while preventing the tip portion of the piercing pin 34 from being damaged by collision.

Meanwhile, the first piercing plate 31 may be provided with a first O-ring (not shown). The first O-ring forms the gas venting area for blocking the peripheral area of the piercing hole 5c from the outside to efficiently vent gas coming out through the piercing hole 5c. The first O-ring is made of silicone and formed on an opposite surface to the second piercing plate 33 so as to be partitioned from an area including the insertion groove. Therefore, when the second piercing plate 33 is in close contact with the gas pocket 9, the gas venting area may be formed by the first O-ring made of silicone.

Further, the first piercing plate 31 may be formed with a first suction hole (not shown). A plurality of first suction holes is formed to penetrate the inner side of the first piercing plate 31 and communicate with the inside of the first O-ring, i.e., the gas venting area. The plurality of first suction holes is connected to a separately provided pumping line. Specifically, the plurality of first suction holes is formed to penetrate the second piercing plate 31 at the inside and connected to the pumping line at the outside, thereby allowing a vacuum suction pump to perform the vacuum suction for the gas from the gas venting area (i.e., a blocking space formed between the first piercing plate 31 and the gas pocket 9 which are in close contact with each other).

In this way, when the vacuum suction pump operates after forming the piercing hole 5c in the gas pocket 9, gas in the gas pocket 9 comes out to the gas venting area corresponding to the blocking space formed between the first piercing plate 31 and the gas pocket 9 which are in close contact with each other, and this gas is vent out to the outside through the first suction hole by the vacuum suction.

The piercing pin 34 formed in the second piercing plate 33 may form the piercing hole 5c in the gas pocket 9, and may include a tip portion to be inserted in the insertion groove formed on an opposite surface to the first piercing plate 31 in order to form the piercing hole 5c by penetrating the gas pocket 9. The tip portion of the piercing pin 34 may have a sharp or blade shape to easily form the piercing hole 5c in the gas pocket 9.

The second piercing plate 33 may be formed with a second O-ring (not shown). The second O-ring forms a gas venting area (i.e., a blocking space formed between the second piercing plate 33 and the gas pocket 9) for blocking the peripheral area of the piercing hole 5c from the outside to efficiently vent gas coming out through the piercing hole 5c. The second O-ring is made of silicone and formed to be partitioned from an area including the piercing pin 34. Therefore, when the second piercing plate 33 is in close contact with the gas pocket 9, the gas venting area may be formed by the second O-ring made of silicone. The second O-ring may be formed at a position corresponding to the first O-ring.

The second piercing plate 33 may be formed with a second suction hole (not shown). A plurality of second suction holes is formed to penetrate the inner side of the second piercing plate 33 and communicate with the inside of the second O-ring, i.e., the gas venting area. Like the first suction holes, the plurality of second suction holes is connected to a separately provided pumping line. Specifically, the plurality of second suction holes is formed to penetrate the second piercing plate 33 at the inside and connected to the pumping line at the outside, thereby allowing the vacuum suction pump to perform the vacuum suction for the gas from the gas venting area (i.e., a blocking space formed between the second piercing plate 33 and the gas pocket 9 which are in close contact with each other).

In this way, when the vacuum suction pump operates after forming the piercing hole 5c in the gas pocket 9, gas in the gas pocket 9 comes out to the gas venting area corresponding to the blocking space formed between the second piercing plate 33 and the gas pocket 9 which are in close contact with each other, and this gas is vent out to the outside through the second suction hole by the vacuum suction.

The sealing pad 26 may be shaped like "⌐⌐⌐". The pad contact portion may also be formed like "⌐⌐⌐" and corresponding to the sealing pad 26. When gas is completely vented through the piercing operation and the vacuum suction operation, the sealing pad 26 performs an operation of sealing the periphery of the piercing hole 5c by thermal fusion. Then, an additional sealing portion 5b (see FIG. 10) corresponding to the sealing pad 26 shaped like "⌐⌐⌐" is formed in the gas pocket 9.

Although a few embodiments of the disclosure have been described above, it will be apparent for a person having ordinary knowledge in the art that these descriptions are for the illustrative purposes only and various changes can be made without departing from the scope of the disclosure. Accordingly, the genuine technical scope of the disclosure should be defined by the appended claims.

INDUSTRIAL APPLICABILITY

According to the disclosure, a pressure activation apparatus with a degassing unit is configured to remove gas, which is generated in a pressure activation process for a plurality of pouch-type battery cells respectively mounted to a plurality of pressure units, through one movably provided degassing unit, thereby improving a process efficiency in manufacturing the pouch-type battery cell, and reducing time, efforts and costs for the degassing.

The invention claimed is:

1. A pressure activation apparatus comprising:
a plurality of pressure units each pressurizing opposite sides of a plurality of pouch-type battery cells; and
a degassing unit disposed above the plurality of pressure units and removing gas generated inside the plurality of pouch-type battery cells,
wherein the degassing unit is movably disposed above the plurality of pressure units and performs a degassing process for the plurality of pouch-type battery cells pressurized in the pressure units,
wherein the degassing unit comprises:
a transport unit disposed along an arrangement direction of the plurality of pressure units;
a transport block mounted to reciprocate along the arrangement direction of the plurality of pressure units by the transport unit; and
a plurality of venting modules disposed in a row along the arrangement direction of the plurality of pouch-type battery cells, mounted to and supported by the transport block, and venting gas out of the gas pocket through vacuum suction after forming a piercing hole in the gas pocket of each pouch-type battery cell,
wherein the plurality of pouch-type battery cells comprise:
a first group including odd-numbered pouch-type battery cells, and a second group including even-numbered pouch-type battery cells, and
wherein the plurality of venting modules are disposed to correspond to only one of the first group and the second group.

2. The pressure activation apparatus of claim 1, wherein each of the plurality of the venting modules seals a periphery of the piercing hole when gas is completely vented out of the gas pocket.

3. The pressure activation apparatus of claim 1, wherein the plurality of venting modules are driven to sequentially perform the degassing process for any one of the first and second groups, and then perform the degassing process for the other of the first and second groups.

4. The pressure activation apparatus of claim 3, wherein, when the plurality of venting modules completes the degassing process for any one of the first and second groups, the transport block drives the plurality of venting modules to be moved up and horizontally transported to a position corresponding to the other of the first and second groups, and the degassing process for the other of the first and the second groups is performed.

5. The pressure activation apparatus of claim 1, wherein the venting module comprises a first air chuck cylinder generating a driving force for performing a sealing operation to seal the piercing hole formed in the gas pocket against the outside, and a second air chuck cylinder disposed below the first air chuck cylinder and generating a driving force for performing an operation to form the piercing hole in the gas pocket.

6. The pressure activation apparatus of claim 1, wherein the plurality of venting modules are disposed to correspond to any one of the first and second groups, while not being disposed to correspond to the other of the first and second groups.

7. The pressure activation apparatus of claim 1, wherein the plurality of venting modules are spaced apart from one another to allow either each of the odd-numbered pouch-type battery cells of the first group or each of the even-numbered pouch-type battery cells of the second group to be disposed in each space between adjacent venting modules.

* * * * *